(12) United States Patent
Nojima (10) Patent No.: US 8,199,441 B2
(45) Date of Patent: Jun. 12, 2012

(54) HEAD SUSPENSION

(75) Inventor: Akira Nojima, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 321 days.

(21) Appl. No.: 12/557,637

(22) Filed: Sep. 11, 2009

(65) Prior Publication Data

US 2010/0073824 A1 Mar. 25, 2010

(30) Foreign Application Priority Data

Sep. 19, 2008 (JP) ................. 2008-241611

(51) Int. Cl.
*G11B 21/10* (2006.01)
*G11B 5/596* (2006.01)
*G11B 21/21* (2006.01)
(52) U.S. Cl. ................................. 360/294.4
(58) Field of Classification Search ............. 360/294.4
See application file for complete search history.

(56) References Cited

U.S. PATENT DOCUMENTS

| | | | |
|---|---|---|---|
| 6,538,854 B2* | 3/2003 | Koganezawa et al. | 360/294.4 |
| 6,617,762 B2* | 9/2003 | Kurano et al. | 310/328 |
| 6,791,802 B2* | 9/2004 | Watanabe et al. | 360/294.4 |
| 7,130,159 B2* | 10/2006 | Shimizu et al. | 360/294.4 |
| 7,440,236 B1* | 10/2008 | Bennin et al. | 360/294.4 |
| 7,459,835 B1* | 12/2008 | Mei et al. | 310/330 |
| 2002/0043894 A1 | 4/2002 | Koganezawa et al. | |
| 2008/0094758 A1* | 4/2008 | Liao et al. | 360/294.4 |

FOREIGN PATENT DOCUMENTS

| | | |
|---|---|---|
| JP | 2-172073 | 7/1990 |
| JP | 9-210613 | 8/1997 |
| JP | 10-125539 | 5/1998 |
| JP | 2000-182341 | 6/2000 |
| JP | 2002-050140 | 2/2002 |
| JP | 2002-141569 | 5/2002 |
| JP | 2002-184140 | 6/2002 |
| JP | 2003-061371 | 2/2003 |
| JP | 2006-179119 | 7/2006 |
| JP | 2007-095275 | 4/2007 |

* cited by examiner

*Primary Examiner* — Will J Klimowicz
(74) *Attorney, Agent, or Firm* — Jordan and Hamburg LLP (57) ABSTRACT

A head suspension 31 has a piezoelectric element 13 that deforms in response to a voltage applied thereto, a base plate 33 having an opening 43 into which the piezoelectric element 13 is fitted, and a load beam 35 that is fixed to the base plate 33 so that a front end of the load beam 35 moves in a sway direction according to the deformation of the piezoelectric element 13. The head suspension 31 includes an electric insulating layer 51 formed at the opening 43 by vapor-depositing and polymerizing electrically insulative high polymer materials at the opening 43. The piezoelectric element 13 is fitted into the opening 43 through at least the electric insulating layer 51. The head suspension 31 satisfies a miniaturization requirement.

8 Claims, 7 Drawing Sheets

HEAD SUSPENSION

BACKGROUND OF THE INVENTION

1. Field of the Invention

The present invention relates to a head suspension having a piezoelectric element that deforms in response to a voltage applied thereto and is fitted through at least an electric insulating layer to a fitting part of a base of the head suspension.

2. Description of Related Art

Small-sized, precision information devices are rapidly advancing and needs for micro-actuators capable of conducting positioning control for very small distances in such devices are also increasing. The devices that particularly need such micro-actuators include optical systems for correcting focuses and inclination angles, ink jet printers for controlling ink heads, and magnetic disk drives for controlling magnetic heads.

The magnetic disk drives have an urgent issue to solve, i.e., increasing storage capacity. The storage capacity of a magnetic disk drive will increase if the storage capacity of each magnetic disk in the magnetic disk drive increases. The storage capacity or recording density of the magnetic disk will increase, without changing the diameter thereof, if the number of tracks per inch (TPI) on the magnetic disk increases. For this, the width of each track on the magnetic disk must be narrowed. To handle such narrow tracks on a magnetic disk, a magnetic head of a head suspension in the magnetic disk drive must conduct precise positioning in a direction across the tracks. For realizing the precise positioning, there is a need of an actuator capable of accurately moving and positioning the magnetic head of the head suspension within a very small area.

To meet the need, the applicant of the present invention has proposed in Japanese Unexamined Patent Application Publication No. 2002-50140 a head suspension for a disk drive. The head suspension includes a base plate, a connection plate having a hinge thinner than the base plate, a load beam provided with a flexure and a magnetic head, and a pair of piezoelectric elements.

This related art employs a dual actuator system for positioning the magnetic head. The dual actuator system involves a voice coil motor and the piezoelectric elements made of PZT (lead zirconate titanate).

The piezoelectric elements minutely drive a front end of the load beam in a widthwise direction (sway direction) of the head suspension. Compared with a single actuator system employing only the voice coil motor, the dual actuator system employing the voice coil motor and piezoelectric elements more precisely positions the magnetic head attached to the front end of the head suspension.

An important issue for the head suspension employing the dual actuator system is how to mount the piezoelectric elements on the head suspension.

As an approach to address the issue, the applicant of the present invention has proposed in Japanese Unexamined Patent Application Publication No. 2002-184140 (in particular, an adhesive layer 80 in paragraphs 0024 to 0026 and FIG. 5) a head suspension for a disk drive. The head suspension includes a load beam, a flexure attached to the load beam, an actuator base including a base plate, and a pair of piezoelectric elements. The actuator base has an attaching part to which the pair of piezoelectric elements is attached through the adhesive layer that is electrically insulative.

The adhesive layer according to this related art includes an adhesive that functions as an electrically insulative matrix resin and a granular filler. The granular filler is made of an electrically insulative material and is mixed with the adhesive. The granular filler interposes between the piezoelectric elements and the attaching part, to secure electric insulation.

According to this related art, there will be a situation that there is little or no granular filler in the adhesive between the piezoelectric elements and the attaching part. To avoid such a situation, a relatively wide space including a designing allowance must be maintained between the piezoelectric elements and the attaching part. This results in increasing the size of the attaching part and leaving a miniaturization request for head suspensions unfulfilled.

SUMMARY OF THE INVENTION

An object of the present invention is to provide a head suspension capable of satisfying a miniaturization request for head suspensions.

In order to accomplish the object, an aspect of the present invention provides a head suspension having a piezoelectric element that deforms in response to a voltage applied thereto, a base having a fitting part to which the piezoelectric element is fitted, and a load beam that is fixed to the base so that a front end of the load beam moves in a sway direction according to the deformation of the piezoelectric element. The head suspension includes an electric insulating layer formed on the fitting part by vapor-depositing and polymerizing electrically insulative high polymer materials on the fitting part, the piezoelectric element being fitted to the fitting part through at least the electric insulating layer.

This aspect of the present invention forms the electric insulating layer between the piezoelectric element and the fitting part by vapor-depositing and polymerizing electrically insulative high polymer materials on the fitting part. The electric insulating layer stably maintains a designed electric insulating characteristic and is uniform in thickness without regard to the shape of the fitting part. This aspect eliminates the need of a relatively wide space including a designing allowance to be secured between the piezoelectric element and the fitting part.

Namely, this aspect allows the size of the fitting part to be minimized according to the size of the piezoelectric element. As a result, the head suspension of this aspect increases the degree of designing freedom and meets the need for miniaturization.

DETAILED DESCRIPTION OF EMBODIMENTS

A head suspension according to an embodiment of the present invention will be explained in detail with reference to the drawings.

Figure 1:
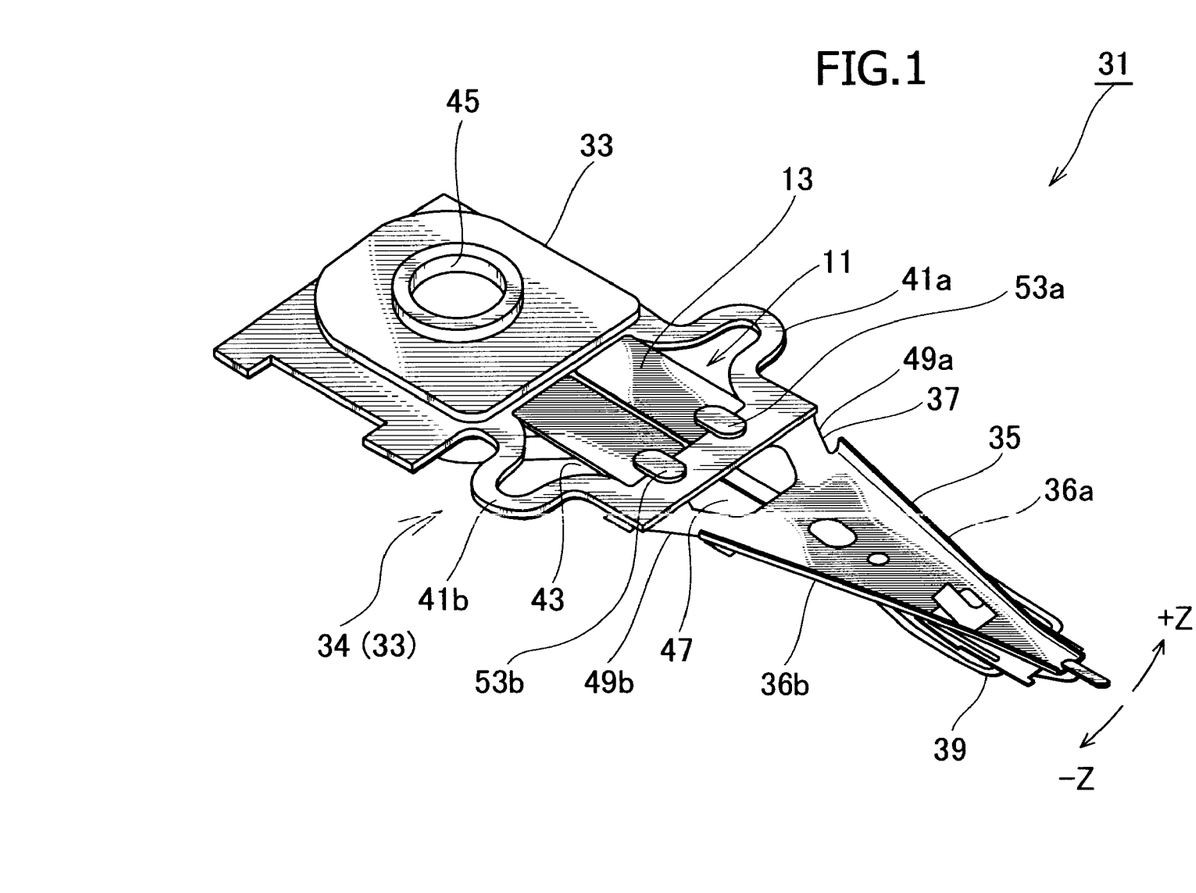
FIG. 1 is a perspective view illustrating a head suspension according to an embodiment of the present invention.

FIG. 1 is a perspective view illustrating the head suspension 31 according to an embodiment of the present invention.

The head suspension 31 includes a piezoelectric actuator 11 consisting of a piezoelectric element 13 that deforms in response to a voltage applied thereto, a base plate 33 (corresponding to the base stipulated in the claims), a load beam 35, a connection plate 37 functioning as a hinge, and the like. The base plate 33 has an opening 43 (corresponding to the fitting part stipulated in the claims) into which the piezoelectric element 13 is fitted. The piezoelectric element 13 deforms in response to an applied voltage, to move a front end of the load beam 35 in a sway direction, i.e., a widthwise direction of the head suspension 31.

The base plate 33 is made of, for example, a stainless steel thin plate having a thickness of about 150 to 200 μm. The base plate 33 includes a pair of flexible parts 41a and 41b each having a U-shape, the opening 43 for accommodating the piezoelectric element 13, and a circular boss 45. The flexible parts 41a and 41b each are outwardly curved at a location corresponding to a side face of the piezoelectric element 13. The base plate 33 is fixed to a front end of an actuator arm (not illustrated) that is driven and turned by a voice coil motor (not illustrated).

The base plate 33 may be made of light metal such as aluminum alloy or a clad material consisting of light metal and stainless steel. The light metal may reduce the inertia of the base plate 33, increase the resonant frequency of the head suspension 31 in a sway direction, and improve the tracing performance of the head suspension 31.

Instead of providing the base plate 33 with the flexible parts 41a and 41b and opening 43, an actuator plate 34 having the flexible parts 41a and 41b and opening 43 may be used. In this case, a rear end of the actuator plate 34 is laid on the base plate 33 and is fixed thereto by, for example, laser welding. According to the present invention, the head suspension 31 may employ both the base plate 33 and actuator plate 34, or the base plate 33 alone. In the following explanation, the actuator plate 34 is considered to be integral with the base plate 33 for the sake of simplicity of explanation.

The load beam 35 has a flexure 39. The flexure 39 is made of a metal thin plate spring that is thinner and more accurate than the load beam 35. A front end of the flexure 39 is provided with a slider (not illustrated) having a magnetic head. The load beam 35 is made of a stainless steel plate having a thickness of about 30 to 150 μm and is designed to apply load onto the slider. The load beam 35 has bent edges 36a and 36b to improve the rigidity of the load beam 35. A rear end of the load beam 35 is integral with the connection plate 37. The load beam 35 may be made of light metal such as aluminum alloy or a clad material consisting of light metal and stainless steel. The light metal may reduce the inertia of the load beam 35, increase the resonant frequency of the head suspension 31 in a sway direction, and improve the tracing performance of the head suspension 31.

The connection plate 37 is made of a resilient metal plate having a thickness of about 30 μm. A part of the connection plate 37 has a hole 47 to reduce the rigidity thereof in a thickness direction. On each side of the hole 47, there are hinges 49a and 49b that bend in the thickness direction. A rear end of the connection plate 37 is laid on a front end of a bottom face of the base plate 33 and is fixed thereto by, for example, laser welding.

The piezoelectric actuator 11 fitted to the head suspension 31 will be explained.

Figure 2:
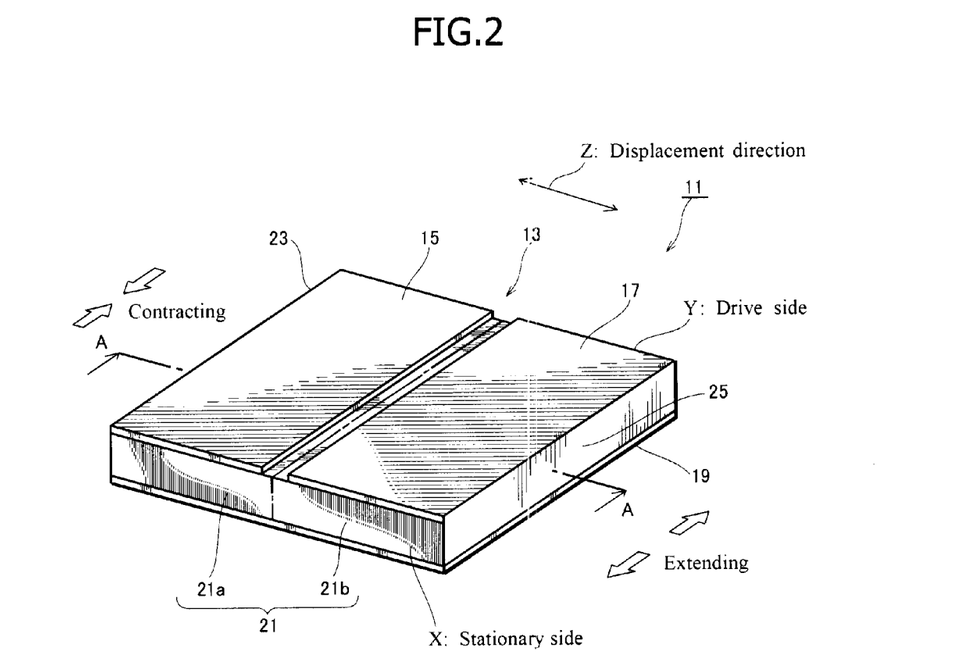
FIG. 2 is a perspective view illustrating a piezoelectric actuator arranged in the head suspension of FIG. 1.
Figure 3:
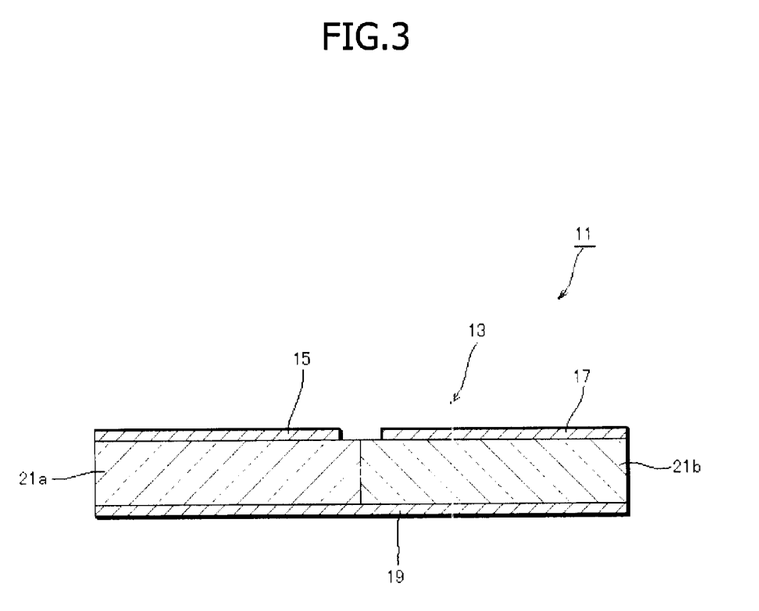
FIG. 3 is a sectional view taken along a line A-A of FIG. 2.

FIG. 2 is a perspective view illustrating the piezoelectric actuator 11 fitted to the head suspension 31 and FIG. 3 is a sectional view taken along a line A-A of FIG. 2.

The piezoelectric actuator 11 consists of the piezoelectric element 13 substantially having a rectangular shape. The piezoelectric element 13 deforms in response to an applied voltage, to drive an objective part (the load beam 35). More precisely, the piezoelectric element 13 deforms when a voltage is applied thereto, or when the voltage applied thereto is stopped, or according to the level of a voltage applied thereto.

The piezoelectric element 13 includes first and second electrodes 15 and 17 that are arranged in a common plane and are separated from each other by a predetermined distance, a common electrode 19 opposing the first and second electrodes 15 and 17, and a piezoelectric material 21 arranged between the first and second electrodes 15 and 17 and the common electrode 19. The first and second electrodes 15 and 17 and common electrode 19 may be made of metal having a low contact resistance, such as gold (Au). The first and second electrodes 15 and 17 substantially have the same shape and size. The common electrode 19 is substantially equal in size and shape to a combination of the first and second electrodes 15 and 17.

The piezoelectric material 21 consists of a first piezoelectric material 21a that deforms according to a voltage applied to the first electrode 15 and a second piezoelectric material 21b that deforms according to a voltage applied to the second electrode 17. The first and second piezoelectric materials 21a and 21b are arranged so that they are oppositely polarized. The first and second piezoelectric materials 21a and 21b are made of, for example, piezoelectric ceramics that are polarized in polarization directions differing from each other by 180 degrees.

Operation of the piezoelectric actuator 11 will be explained. In FIG. 2, a side of the piezoelectric element 13 marked with "X" is a stationary side, a side marked with "Y" is a drive side, the first and second electrodes 15 and 17 are grounded, and the common electrode 19 receives a voltage.

When receiving the voltage, the piezoelectric element 13 deforms into a trapezoid with an end face 23 of the first electrode 15 contracting and an end face 25 of the second electrode 17 extending. As a result, the piezoelectric element 13 moves in a direction Z (FIG. 2) by a very small distance, to move the part (load beam 35) attached to the drive side Y of the piezoelectric element 13. When the common electrode 19 is grounded and the first and second electrodes 15 and 17 receive a voltage, the piezoelectric element 13 moves in a direction −Z (opposite to the direction Z) by a minute distance, to displace the part (load beam 35) attached to the drive side Y of the piezoelectric element 13.

The piezoelectric actuator 11 needs three electric systems for the first and second electrodes 15 and 17 and common electrode 19. This configuration simplifies wiring to the piezoelectric element 13 and secures the reliability thereof.

The piezoelectric actuator 11 has the single piezoelectric element 13, to reduce the number of parts, minimize parts management, and reduce the cost of the head suspension 31.

The head suspension 31 will be explained further.

Figure 4:
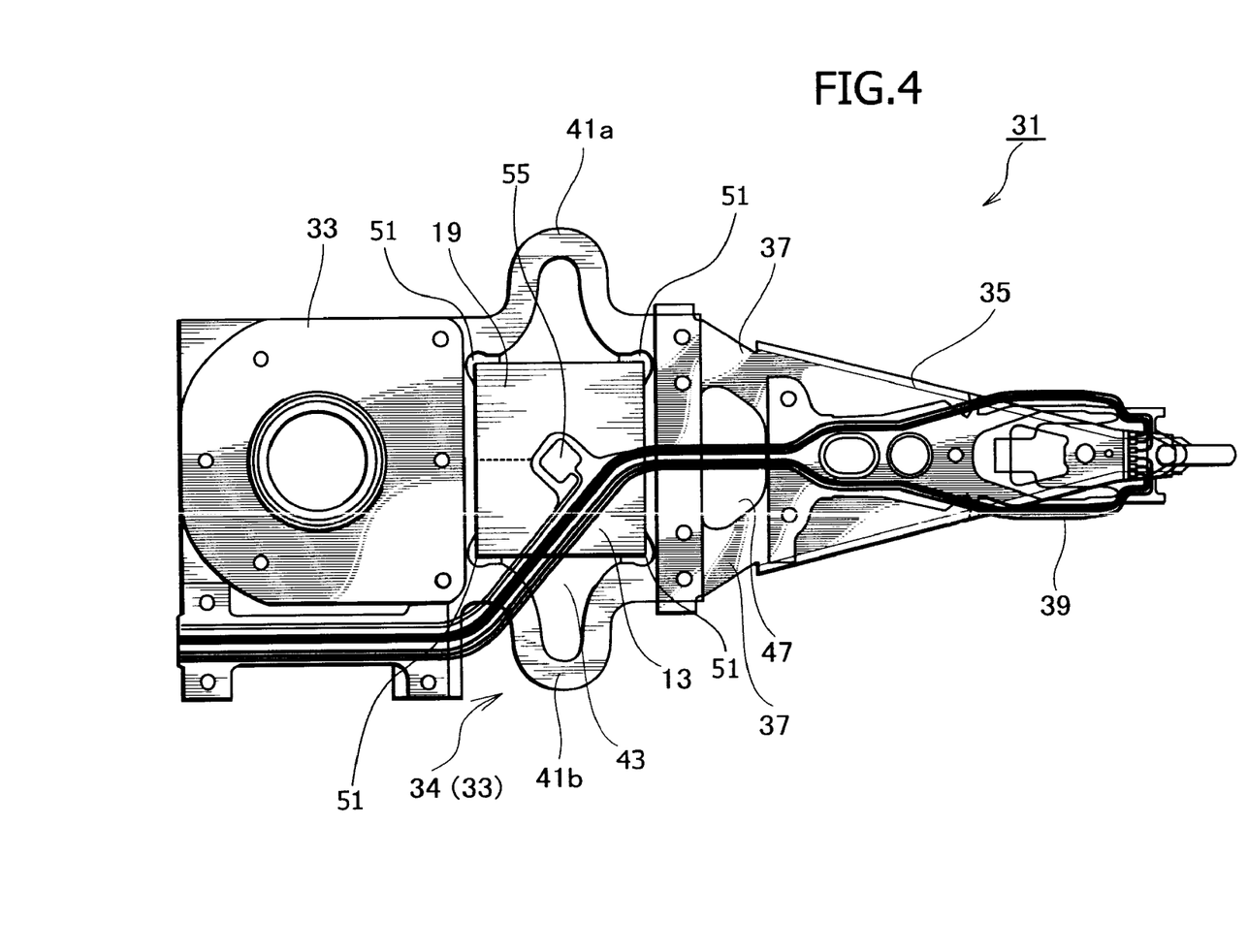
FIG. 4 is a bottom view illustrating the head suspension of FIG. 1.
Figure 5:
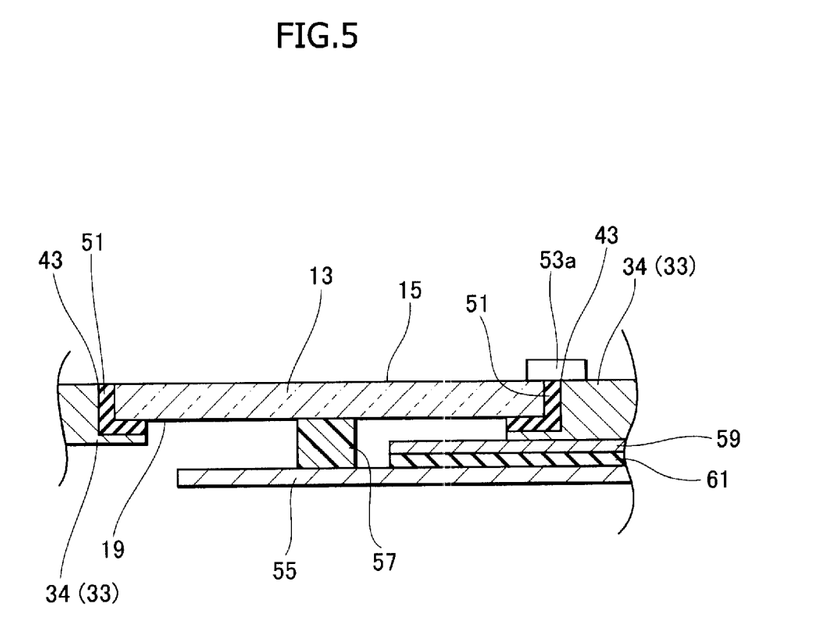
FIG. 5 is a sectional view illustrating an opening of the head suspension of FIG. 1.
Figure 6:
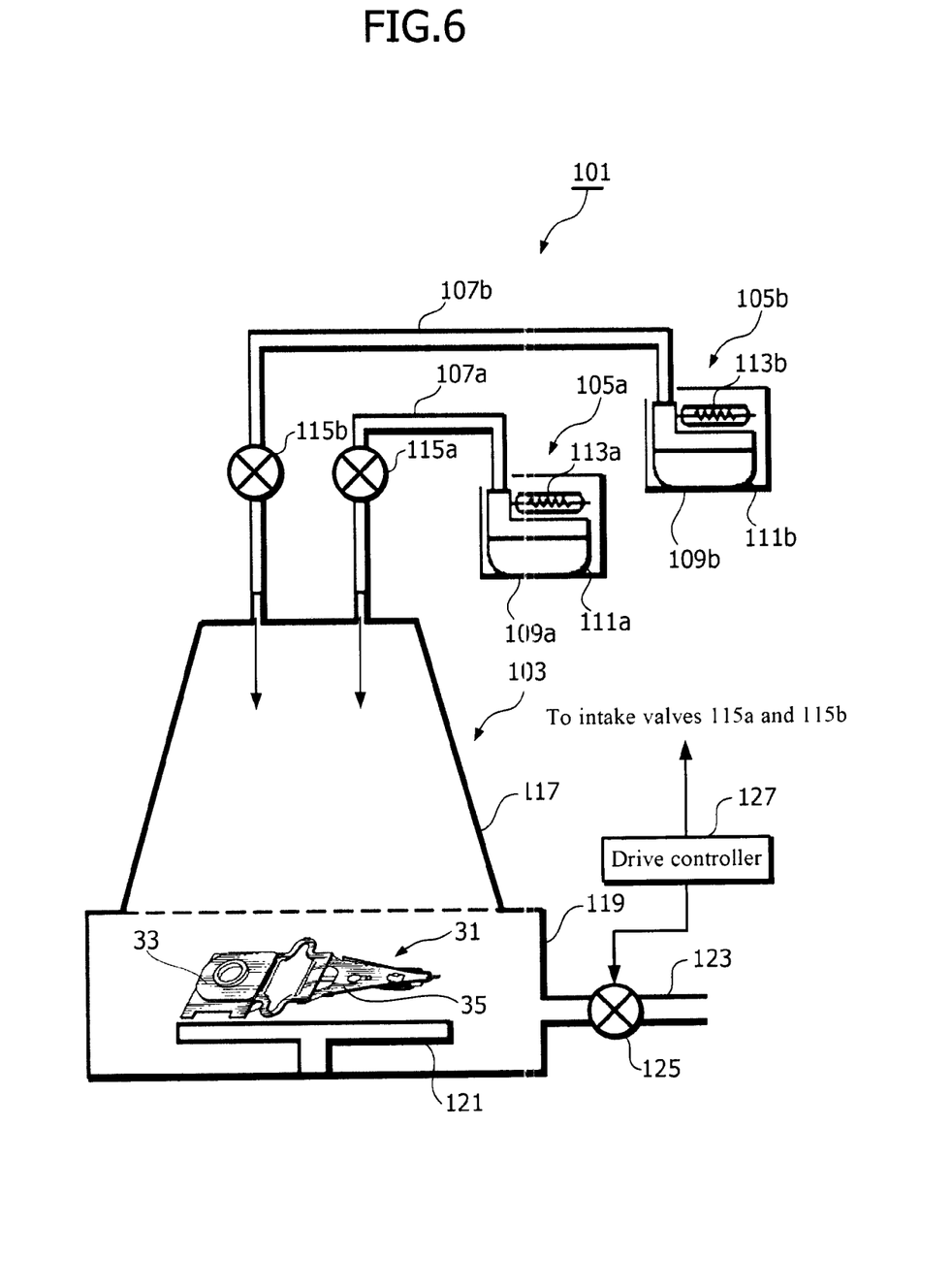
FIG. 6 is a schematic view illustrating a vapor deposition polymerization system used to form an electric insulating layer at the opening of FIG. 5.

FIG. 4 is a bottom view illustrating the head suspension 31, FIG. 5 is a sectional view illustrating the opening 43 of the head suspension 31, and FIG. 6 is a schematic view illustrating a vapor deposition polymerization system used to form an electric insulating layer 51 at the opening 43.

The piezoelectric element 13 is fitted into the opening 43 formed in the base plate 33 of the head suspension 31, so that the first and second electrodes 15 and 17 are on top and the common electrode 19 is at the bottom. Front and rear ends of the opening 43 serve as the fitting part stipulated in the claims to support the piezoelectric element 13. More precisely, the electric insulating layer 51 is formed by vapor-depositing and polymerizing high polymer materials that are electrically insulative, so that the layer 51 covers at least parts of the periphery of the opening 43 that face the piezoelectric element 13. Namely, the piezoelectric element 13 is fixed to the base plate 33 in such a way that the piezoelectric element 13 is fitted into the opening 43 and is supported from below and side by the layer 51 formed at the periphery of the opening 43.

When the piezoelectric element 13 is fitted into the opening 43, a nonconductive adhesive may also be used. In this case, the nonconductive adhesive may be provided with a thixotropic characteristic by adding a thixotropic agent to the adhesive. Such a thixotropic nonconductive adhesive is sol when applied to the piezoelectric element 13.

The vapor deposition polymerization system 101 of FIG. 6 used to form the electrical insulating layer 51 at the opening 43 of the head suspension 31 will be explained. The system 101 has a chamber 103 into which the head suspension 31 is entirely placed.

The chamber 103 is connected through intake pipes 107*a* and 107*b* to vaporizers 105*a* and 105*b* that supply material monomers. The material monomers are vaporized in the vaporizers 105*a* and 105*b* and are guided through the intake pipes 107*a* and 107*b* into the chamber 103.

The vaporizer 105*a* (105*b*) has a housing 109*a* (109*b*) that accommodates a monomer vessel 111*a* (111*b*) for storing the material monomer and a heater 113*a* (113*b*) for heating the material monomer.

The material monomers are used to form a known polyimide and are, for example, pyromellitic dianhydride (PMDA) contained in the monomer vessel 111*a* and 4'-diaminodiphenyl ether (ODA) contained in the monomer vessel 111*b*.

The intake pipe 107*a* (107*b*) that extends from the vaporizer 105*a* (105*b*) to the chamber 103 includes an intake valve 115*a* (115*b*) that is opened and closed to adjust the thickness of a film to be formed by vapor deposition polymerization at the opening 43 of the base plate 33.

The chamber 103 includes a monomer mixing tank 117, a heater (not illustrated) arranged around the monomer mixing tank 117, a reaction tank 119 in which the material monomers react to form a high polymer on a work (the head suspension 31), and a work table 121 on which the work (head suspension 31) is placed. The reaction tank 119 is connected to a discharge pipe 123 to discharge an atmospheric gas from the reaction tank 119 after the completion of vapor deposition polymerization. The discharge pipe 123 has a discharge valve 125 that is opened and closed at proper timing. The valves 115*a*, 115*b*, and 125 are connected to a drive controller 127 that controls the opening and closing of these valves and the vapor deposition polymerization process.

To form a polyimide film at the opening (fitting part) 43 of the head suspension 31 (work) with the use of the system 101, the head suspension 31 is subjected to a predetermined masking process, and thereafter, is set on the work table 121. The drive controller 127 issues instructions to open the intake valves 115*a* and 115*b*, form the film by vapor deposition polymerization, close the intake valves 115*a* and 115*b*, and transport the head suspension 31 to a heat treatment chamber (not illustrated). In the heat treatment chamber, the head suspension 31 is heat-treated. For example, the head suspension 31 is heated to a temperature of 230 degrees at a heating speed of 10 degrees per minute, is kept at the temperature for one hour, and is naturally cooled. The chamber 103 is highly vacuumed or is filled with an atmospheric gas such as an inert gas.

The electrically insulative high polymer film (polyimide film) formed by the above-mentioned vapor deposition polymerization at the opening (fitting part) 43 is the electric insulating layer 51. The layer 51 stably maintains a designed electric insulating characteristic and has a uniform thickness (for example, about 5 to 100 μm) without regard to the shape of the opening 43. There is no need of securing a relatively wide space including a designing allowance between the piezoelectric element 13 and the opening 43. Namely, the size of the opening 43 can be minimized according to the size of the piezoelectric element 13, to reduce the size of the head suspension 31.

If the electric insulating layer 51 is formed by a known technique using polymerization and a reactive solution instead of the vapor deposition polymerization of the present invention, the layer 51 will be thin at a protruding part due to shrinkage and thick at a recessed part due to liquid accumulation, to vary the thickness of the layer 51.

If such a liquid accumulation is created at the opening (fitting part) 43, the liquid accumulation will be a three-dimensional obstruction to prevent the piezoelectric element 13 from being correctly positioned in the opening 43. Namely, variations in the thickness of the electric insulating layer 51 prevent the miniaturization of the head suspension 31.

On the other hand, the electric insulating layer 51 formed at the opening (fitting part) 43 (FIG. 5) by vapor deposition polymerization according to the present invention has a uniform thickness irrespective of the shape of the opening 43, to correctly position the piezoelectric element 13 in the opening 43 and stably maintain a designed electric insulating characteristic.

Since the electric insulating layer 51 is uniform in thickness, the layer 51 never produces three-dimensional obstructions. The size of the opening (fitting part) 43 can be minimized according to the size of the piezoelectric element 13, to reduce the size of the head suspension 31.

Compared with forming the electric insulating layer 51 according to the known technique using polymerization and a reactive solution, the present invention can employ a simpler masking process when masking an area on the head suspension 31 where no electric insulating layer is formed.

The electric insulating layer 51 interposed between the piezoelectric element 13 and the opening (fitting part) 43 of the base plate 33 effectively transmits a distortion (displacement) of the piezoelectric element 13 to the load beam 35 and secures electric insulation between the common electrode 19 of the piezoelectric element 13 and the base plate 33.

According to the embodiment, the base plate 33 and connection plate 37 partly overlap each other and the overlapping part corresponds to the drive side Y of the piezoelectric element 13.

When fitted into the opening 43 and fixed at a predetermined position in the opening 43, the piezoelectric element 13 is restricted by the electric insulating layer 51 formed at the opening 43. In the opening 43, the common electrode 19 of the piezoelectric element 13 faces wiring 55 of the flexure 39 as illustrated in FIG. 5. The wiring 55 is made of, for example, copper. A gap of several tens of micrometers is present between the wiring 55 and the common electrode 19. In the gap, a conductive adhesive 57 is applied to secure electric connection between the wiring 55 and the common electrode 19. The conductive adhesive 57 may be provided with a thixotropic characteristic so that the adhesive 57 is sol when applied. Instead of the conductive adhesive 57, a bonding wire, soldering, ultrasonic bonding, and the like may be employed to electrically connect the wiring 55 and common electrode 19 to each other.

To electrically connect the first and second electrodes 15 and 17 of the piezoelectric element 13 to the base plate 33, a pair of conductive adhesives 53a and 53b is used. The conductive adhesives 53a and 53b may have thixotropy so that they are sol when applied. In FIG. 5, a numeral 59 is a metal base of the flexure 39 and 61 is an electrical insulating layer of the flexure 39.

Operation of the head suspension 31 according to the embodiment will be explained. It is assumed that the first and second electrodes 15 and 17 of the piezoelectric element 13 are grounded and the common electrode 19 thereof receives a predetermined voltage.

The end face 23 of the first electrode 15 contracts and the end face 25 of the second electrode 17 extends as illustrated in FIG. 2, and therefore, the piezoelectric element 13 deforms into a trapezoid as a whole. Namely, the piezoelectric element 13 minutely moves in the direction Z to move the load beam 35 on the drive side Y in a sway direction (a widthwise direction of the head suspension 31). If the common electrode 19 is grounded and the first and second electrodes 15 and 17 receive a predetermined voltage, the piezoelectric element 13 minutely moves in the direction −Z to move the load beam 35 on the drive side Y in a sway direction.

The head suspension 31 incorporating the piezoelectric actuator 11 needs three electric systems for the first and second electrodes 15 and 17 and common electrode 19 of the piezoelectric element 13. This makes wiring work to the piezoelectric element 13 easy and reliable.

The opening (fitting part) 43 of the base plate 33 accommodates the piezoelectric element 13 fitted therein and supports the same from below. The opening 43 provided with the electric insulating layer 51 surrounds the piezoelectric element 13 to easily position the piezoelectric element 13 and protect the brittle piezoelectric element 13 from being damaged.

The common electrode 19 and wiring 55 facing each other are electrically connected to each other through a single connection, i.e., the conductive adhesive 57. This configuration reduces the number of wires arranged on the flexure 39 and increases the number of flexures to be produced from a material.

Compared with a head suspension using a pair of piezoelectric elements, the head suspension 31 of the embodiment employs the single piezoelectric element 13, to reduce the number of parts, simplify parts management, and reduce the cost of the head suspension 31.

The present invention is not limited to the above-mentioned embodiment and is modifiable without departing from the gist and technical idea thereof mentioned in the claims and specification. Head suspensions according to such modifications also fall in the scope of the present invention.

For example, according to a modification of the present invention, the flexible parts 41a and 41b and the opening 43 are formed on an actuator plate 34 instead of the base plate 33. For this, the term "base plate" in this specification indicates the base plate 33 alone or the base plate 33 plus the actuator plate 34. Accordingly, the "base" stipulated in the claims may be read as "base plate" or "actuator plate". For example, the opening (attaching part) formed in the base plate (base) may be read as the opening (attaching part) formed in the actuator plate (base).

Figure 7:
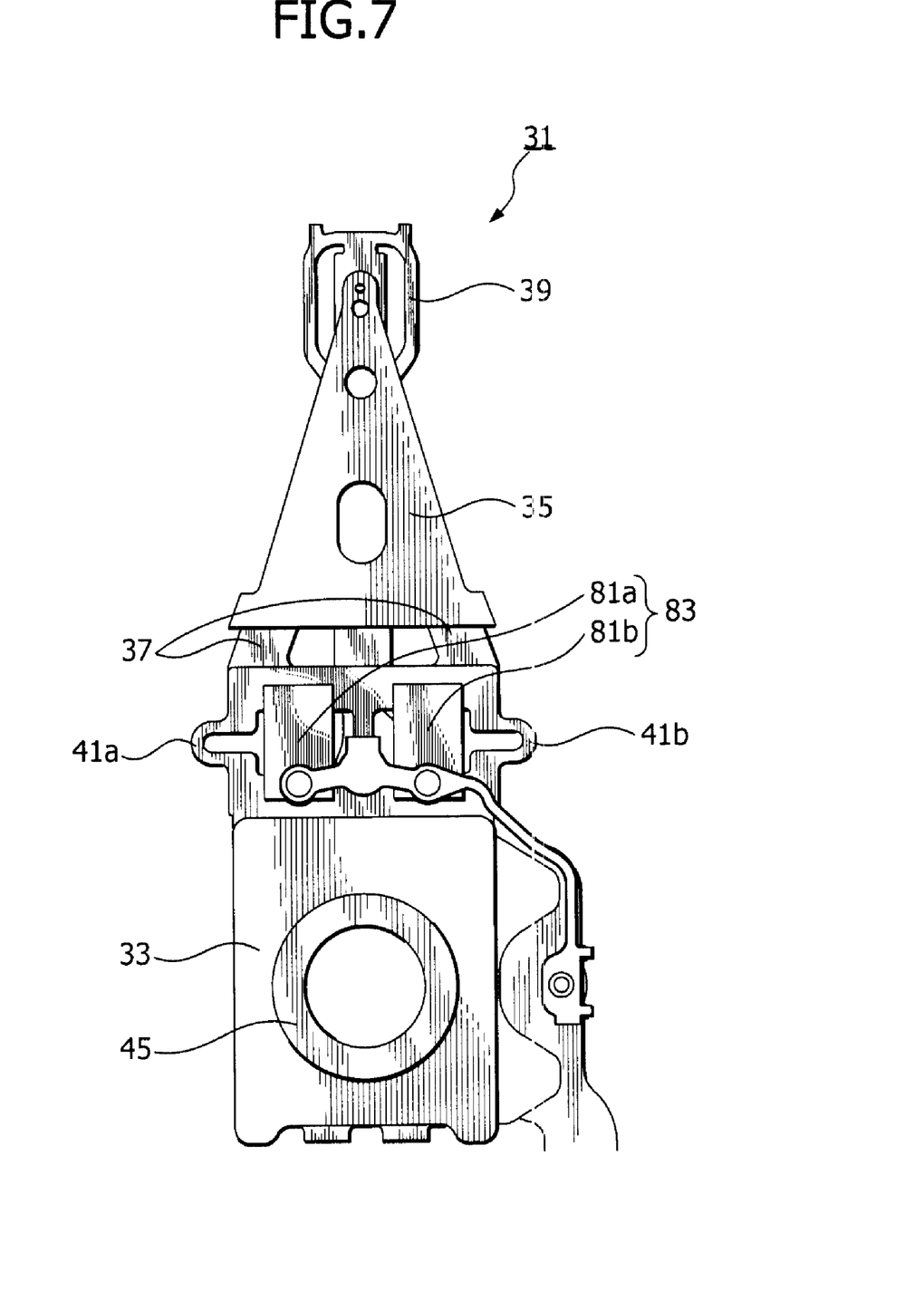
FIG. 7 is a general view illustrating a head suspension according to a modification of the present invention.

According to the embodiment, the piezoelectric actuator 11 consists of one piezoelectric element 13 arranged in the opening 43 of the base plate 33. This does not limit the present invention. According to another modification of the present invention illustrated in FIG. 7, a piezoelectric actuator 83 consists of a pair of piezoelectric elements 81a and 81b. The piezoelectric elements 81a and 81b each are set in an opening (fitting part) 43 of a base plate 33 through an electric insulating layer formed by vapor deposition polymerization.

What is claimed is:
1. A head suspension, comprising:
a piezoelectric element that deforms in response to a voltage applied thereto;
a base having a fitting part with an opening to which the piezoelectric element is fitted;
a load beam that is fixed to the base so that a front end of the load beam moves in a sway direction according to the deformation of the piezoelectric element;
an electric insulating layer formed on the fitting part by vapor-depositing and polymerizing electrically insulative high polymer materials on the fitting part, the piezoelectric element being fitted to the fitting part through at least the electric insulating layer; and
an adhesive, separately formed from the electric insulating layer, which adheres the piezoelectric element to the electric insulating layer at the fitting part; and
wherein the electric insulating layer covers at least part of the fitting part at a periphery of the opening and facing the piezoelectric element, and the electric insulating layer is interposed between the fitting part and the piezoelectric element so as to transmit a distortion of the piezoelectric element to the fitting part.
2. The head suspension of claim 1, wherein:
the electric insulating layer is formed over a section of the fitting part that faces the piezoelectric element.
3. The head suspension of claim 1, wherein:
the electrically insulative high polymer materials include polyimide resin.
4. The head suspension of claim 1, wherein:
the fitting part is an opening formed in the base and configured to receive the piezoelectric element.
5. The head suspension of claim 1, wherein:
the base is one of a base plate and an actuator plate.
6. A head suspension, comprising:
a piezoelectric element that deforms in response to a voltage applied thereto, the piezoelectric element having a first face, a second face opposite the first face, and at least one side face extending from the first face to the second face, the piezoelectric element comprising a piezoelectric first material, a piezoelectric second material, a first electrode at a surface of the piezoelectric first material, a second electrode at a surface of the piezoelectric second material, and a common electrode that is common to both the piezoelectric first material and the piezoelectric second material;
a base having a fitting part defining an opening, the piezoelectric element's first material, second material, and at least one side face being fitted into the opening;
a load beam that is fixed to the base so that a front end of the load beam moves in a sway direction according to the deformation of the piezoelectric element;
a vapor-deposited, polymerized, electric insulating layer covering at least part of the fitting part at a periphery of the opening facing the piezoelectric element, and formed by vapor-depositing and polymerizing electrically insulative high polymer materials on the fitting part, the piezoelectric element being fitted to the fitting part through at least the electric insulating layer with the electric insulating layer surrounding a first portion of the piezoelectric from the first face, along said at least one side face to the second face so as to transmit a distortion of the piezoelectric element to the fitting part; and an adhesive, distinct from the electric insulating layer, which adheres the piezoelectric element to the electric insulating layer at the fitting part.

7. The head suspension of claim 6, wherein the electric insulating layer has uniform thickness without regard for a shape of the opening, said uniform thickness being in the range of 5 to 100 μm.

8. The head suspension of claim 6, further comprising a first conductive adhesive extending along a surface comprising a portion of the piezoelectric element first face, a portion of the electric insulating layer, and a portion of a conductive face of the base.

* * * * *